(12) United States Patent
Hori

(10) Patent No.: US 6,543,592 B2
(45) Date of Patent: Apr. 8, 2003

(54) ONE-WAY CLUTCH

(75) Inventor: Isao Hori, Shizuoka (JP)

(73) Assignee: NTN Corporation, Osaka (JP)

( * ) Notice: Subject to any disclaimer, the term of this patent is extended or adjusted under 35 U.S.C. 154(b) by 8 days.

(21) Appl. No.: 09/781,314

(22) Filed: Feb. 13, 2001

(65) Prior Publication Data

US 2001/0013453 A1 Aug. 16, 2001

(30) Foreign Application Priority Data

| Feb. 14, 2000 | (JP) | ................................. 2000-034811 |
| Apr. 18, 2000 | (JP) | ................................. 2000-116213 |
| Apr. 18, 2000 | (JP) | ................................. 2000-116747 |

(51) Int. Cl.$^7$ ......................................... F16D 41/066
(52) U.S. Cl. ..................................... 192/45; 188/82.84
(58) Field of Search ............................. 192/38, 44, 45; 188/82.84

(56) References Cited

U.S. PATENT DOCUMENTS

| 1,642,645 | A | * | 9/1927 | Constantinesco | ............ 192/45 |
| 2,382,331 | A | * | 8/1945 | Peterson et al. | ............... 192/45 |
| 3,103,998 | A | * | 9/1963 | Watson | ........................ 192/45 |
| 3,625,324 | A | * | 12/1971 | Scharf | .......................... 192/45 |
| 3,737,015 | A | * | 6/1973 | Johnson et al. | ................ 192/45 |
| 3,820,640 | A | * | 6/1974 | Marola et al. | ................ 192/45 |
| 3,993,177 | A | * | 11/1976 | Gehrke | ......................... 192/45 |
| 4,093,049 | A | * | 6/1978 | Watson et al. | ................ 192/47 |

FOREIGN PATENT DOCUMENTS

| JP | 62-9034 A | * | 1/1987 |
| JP | 6-50360 A | * | 2/1994 |

* cited by examiner

Primary Examiner—Richard M. Lorence
(74) Attorney, Agent, or Firm—Wenderoth, Lind & Ponack, L.L.P.

(57) ABSTRACT

A full type one-way clutch includes rollers arranged in a full type state between an outer ring having inclined cam surfaces on the inner peripheral surface thereof and a rotary shaft. A spring biases the rollers in such a direction as to engage the cam surfaces, and the spring is arranged in a groove formed in the inner peripheral surface of the outer ring. By keeping all the rollers in abutment with one another, it is possible to reliably and instantly transmit the biasing force of the spring to all the rollers without reducing the torque-transmitting ability while improving the responsiveness of the clutch.

22 Claims, 11 Drawing Sheets

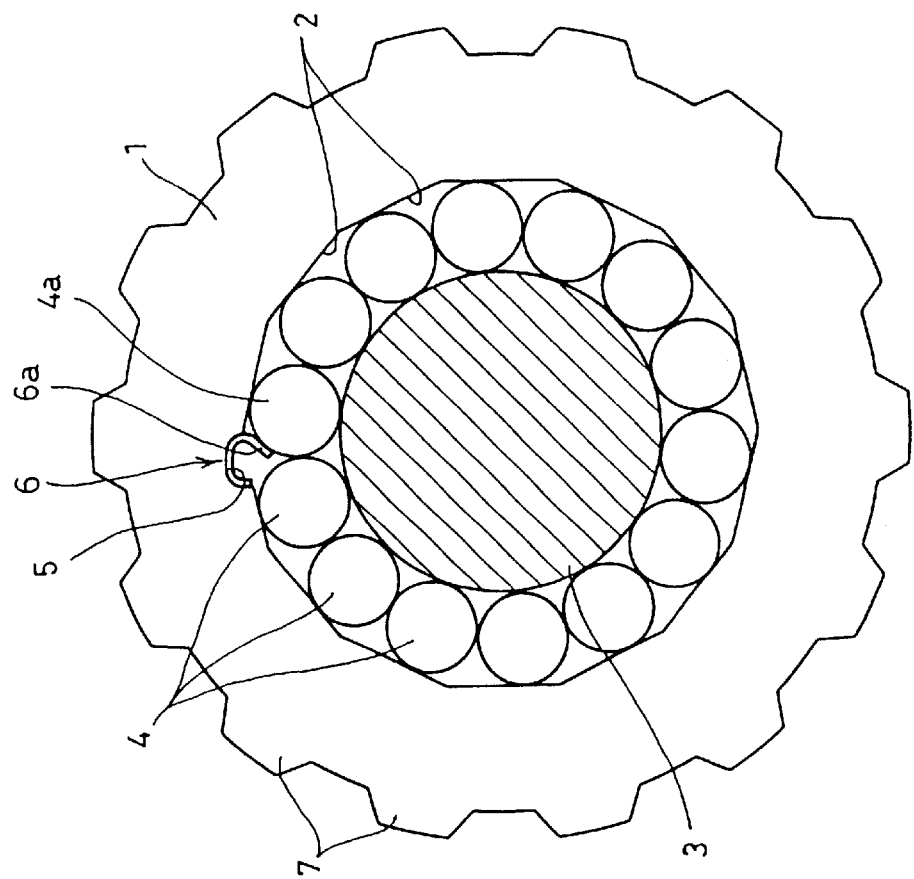
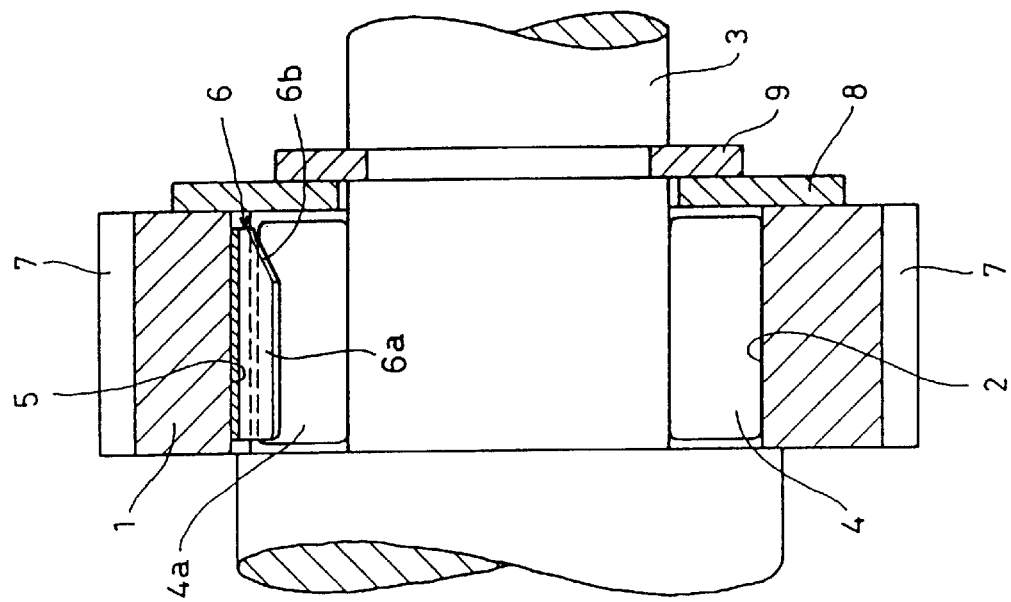

FIG.10
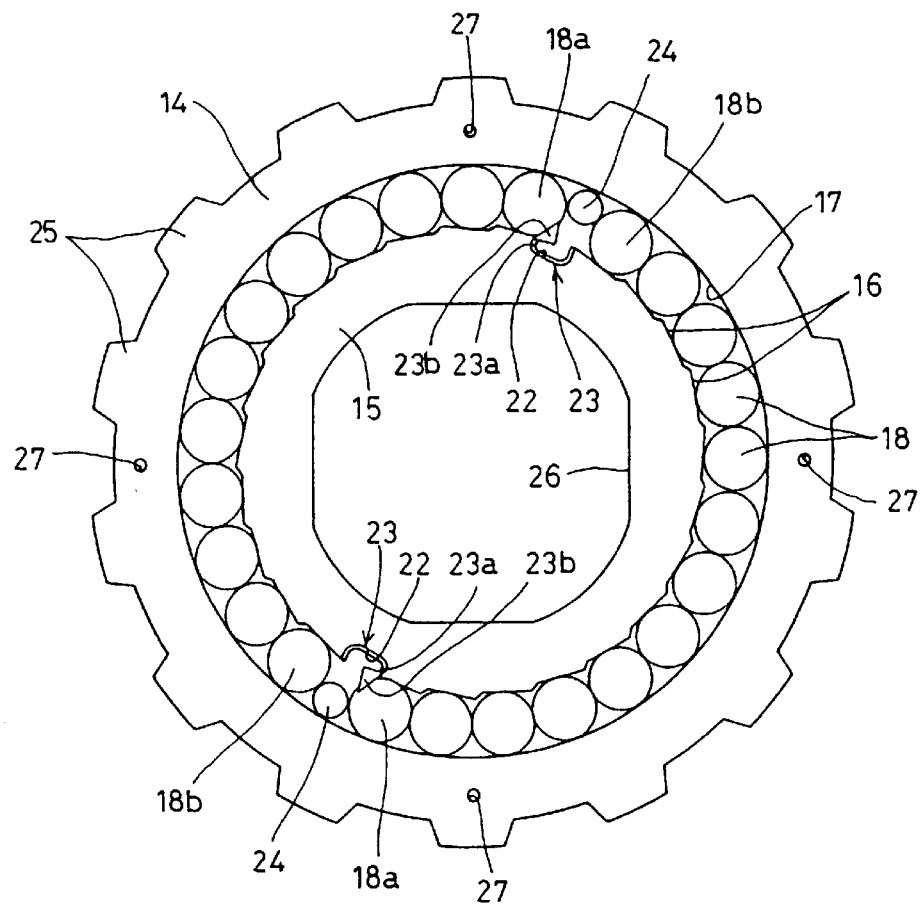
FIG.11A
FIG.11B
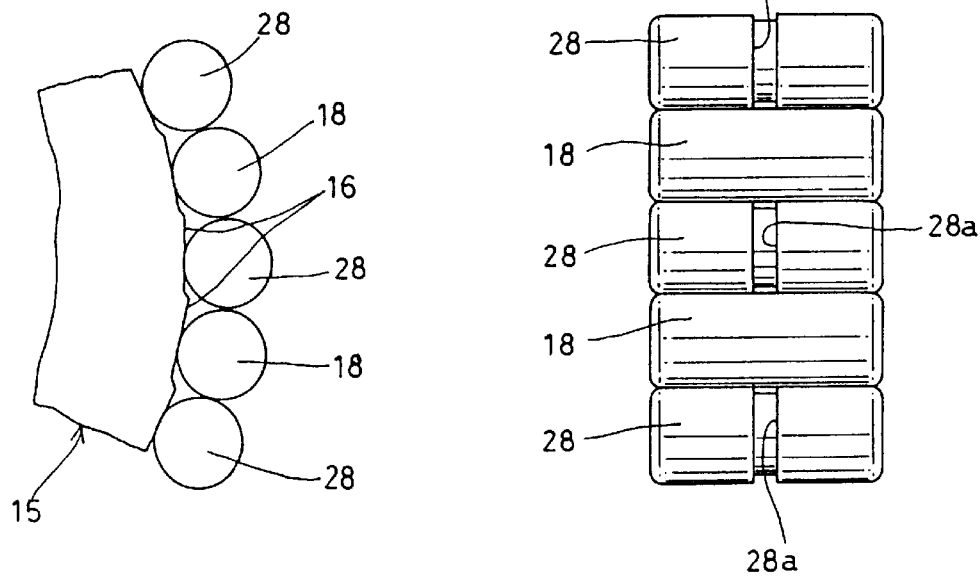

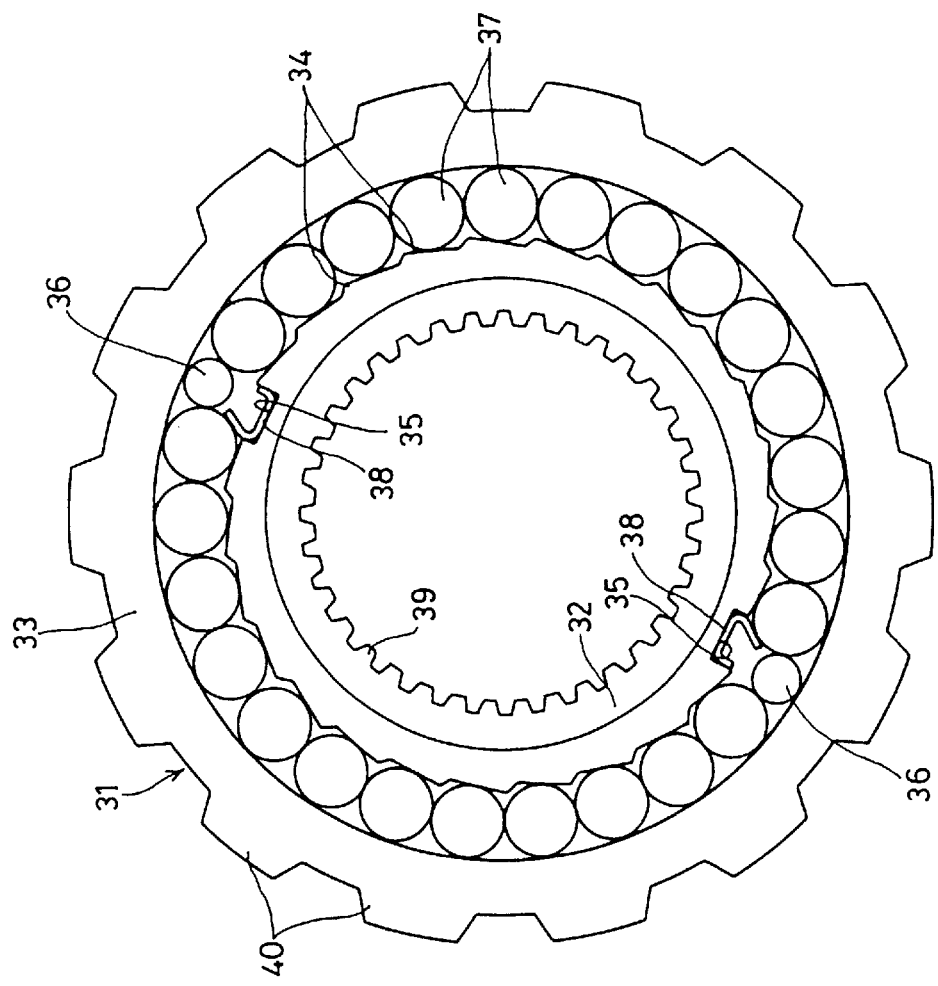
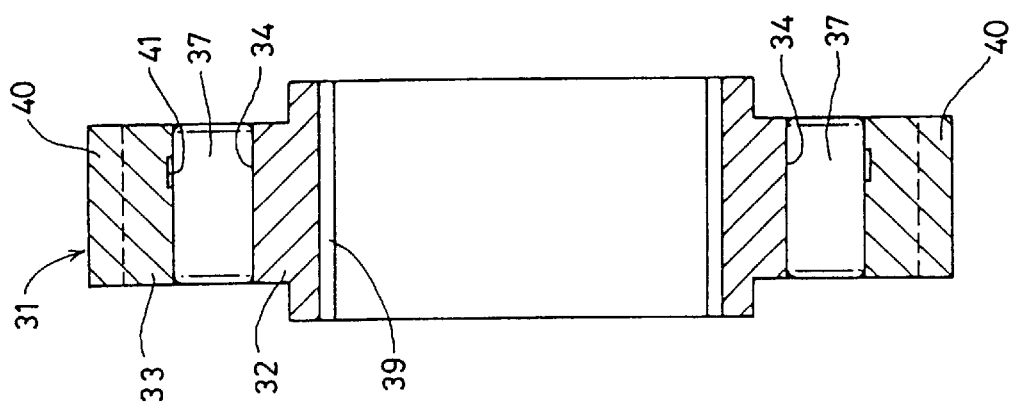

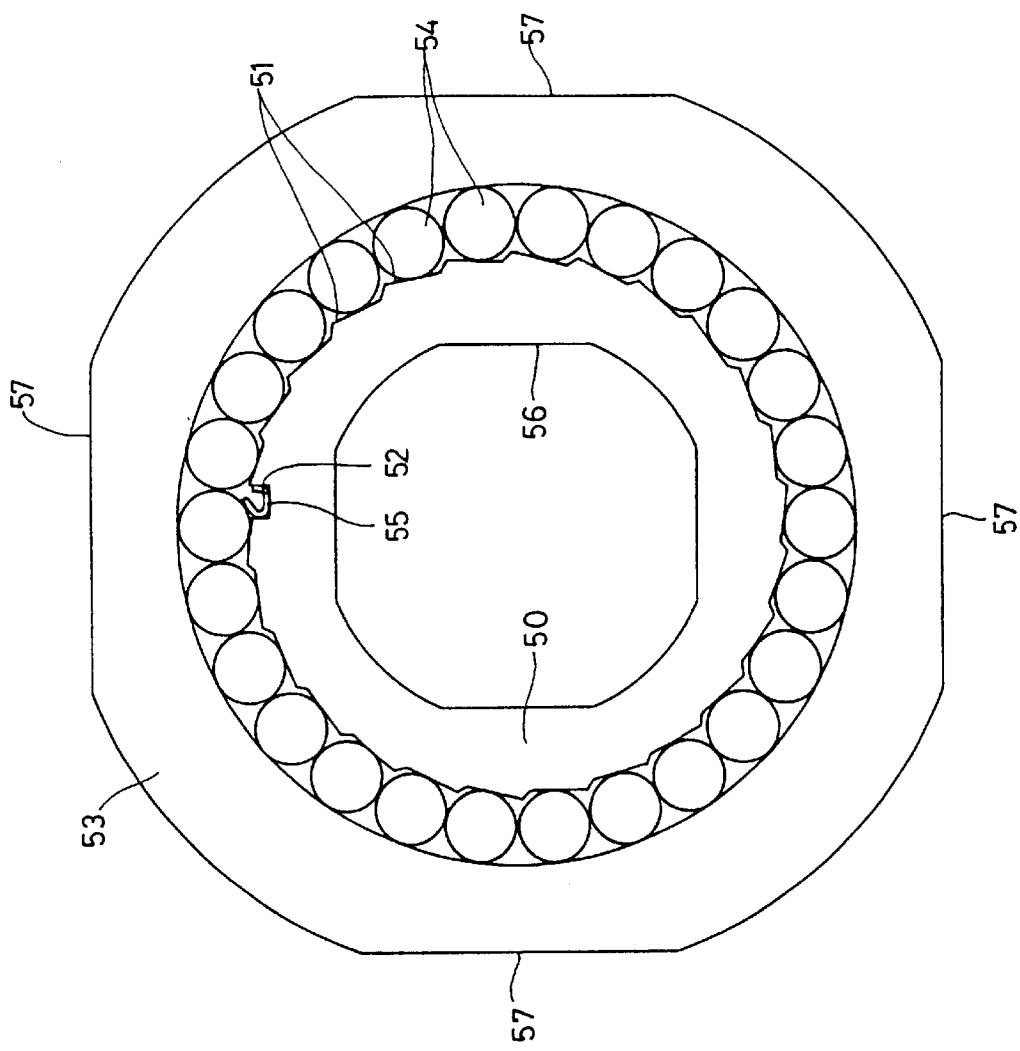
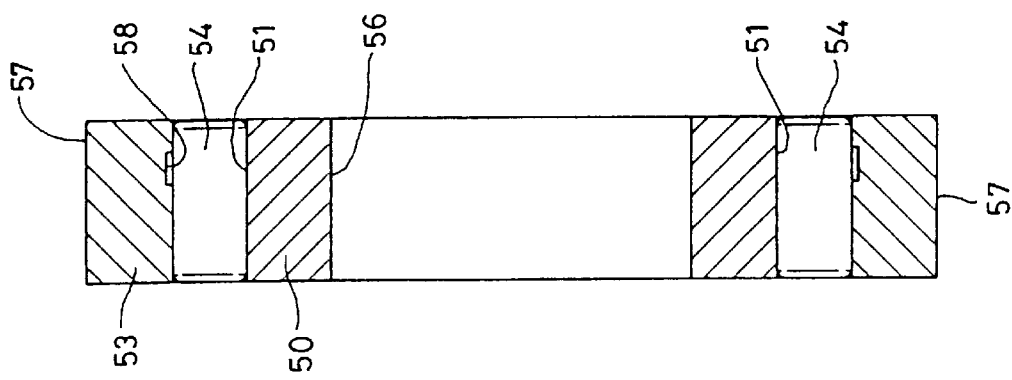

PRIOR ART

ONE-WAY CLUTCH

BACKGROUND OF THE INVENTION

This invention relates to a one-way clutch using rollers as engaging elements.

One-way clutches in which rollers are engaging elements, such as that disclosed in Japanese patent publication 47-43645, are known. With these one-way clutches, as shown in FIGS. 16 and 17, between the inner peripheral surface of an outer hollow member (outer member) 61 and the outer peripheral surface of an inner shaft member (inner member) 62, rollers 63 are housed in a so-called full-type state so as to surround the inner shaft member 62 while abutting each other. Each roller 63 is adapted to engage one of a plurality of inclined cam surfaces 64 formed on the inner peripheral surface of the outer hollow member 61 in one direction due to the wedge effect. When the outer hollow member 61 rotates clockwise or the inner shaft member 62 rotates counterclockwise, each roller 63 engages its respective cam surface 64, so that torque is transmitted.

With the one-way clutch shown in FIG. 16, the rollers 63 are housed so as to surround the entire circumference of the inner shaft member 62. When the outer hollow member 61 or the inner shaft member 62 rotates in the above-said rotational direction, due to the frictional force between the rotary members and the rollers 63, the rollers are adapted to engage the cam surfaces 64. In this embodiment, when frictional force acts on one of the rollers 63, since the rollers engage with one another, all the rollers engage the cam surfaces 64.

With the one-way clutch shown in FIG. 17, one of the rollers 63 housed in a full-type state is replaced with a spring roller 65. Due to the resilience accompanying its resilient deformation, the spring roller 65 urges the adjacent roller 63, so that all the rollers abutting one another engage the cam surfaces 64. Instead of the spring roller 65, a resilient roller such as a rubber roller or a resilient member such as a leaf spring may also be used.

Such full type one-way clutches aim to increase the torque-transmitting capability by increasing the number of rollers arranged and to make a compact design possible by eliminating a cage for rollers.

These conventional full type one-way clutches have the following problems. With the one-way clutch shown in FIG. 16, because the production of frictional force is unstable, it is impossible to reliably bring the rollers into engagement with the cam surfaces, so that the clutch sometimes does not operate.

On the other hand, with a one-way clutch of the type shown in FIG. 17, since the resilient member disposed between the rollers housed in a full-type state such as a spring roller sometimes shrinks excessively due to resilient deformation, a space may be formed between any adjacent rollers or between the resilient member and the adjacent roller, thus making it impossible to instantly and reliably transmit the biasing force of the resilient member to all the rollers. This may cause a lowering of the torque-transmitting capability or a delay in turning on and off the clutch.

An object of this invention is to provide a full type one-way clutch that is superior in responsiveness without lowering the torque-transmitting capability.

SUMMARY OF THE INVENTION

According to this invention, there is provided a one-way clutch comprising an outer member having an inner peripheral surface, and an inner member having an outer peripheral surface. One of the inner and outer peripheral surfaces is formed with a plurality of inclined cam surfaces, and the other is formed into a cylindrical surface. Rollers used as engaging members are arranged between the outer member and the inner member at positions so as to oppose the cam surfaces, and a resilient member is provided for biasing the rollers in such a direction as to engage the cam surfaces. The rollers are brought into abutment with one another directly or through auxiliary rollers having a smaller diameter than the rollers. The resilient member is brought into engagement with the inner peripheral surface of the outer member or the outer peripheral surface of the inner member to transmit the biasing force of the resilient member to all of the rollers through the rollers abutting one another.

By engaging the roller-biasing resilient member on the inner peripheral surface of the outer member or the outer peripheral surface of the inner member, all the rollers can always maintain a mutually abutting state directly or through the auxiliary rollers without any resilient members disposed between the rollers. Therefore, it is possible to reliably and instantly transmit the biasing force of the resilient members to all the rollers.

By making at least one of the inner member and outer member of a sintered metal or by blanking a steel plate, it is possible to manufacture the outer member and inner member at a low cost.

If the blanking is fine-blanking to the finished dimension of the outer member or inner member, it is possible to eliminate finish working such as shaving and reduce the occurrence of thermal strain during heat treatment.

By disposing the auxiliary rollers at positions where the resilient members are provided, it is possible to increase the space for receiving the resilient members, and to increase the biasing force to the rollers by use of a larger resilient member.

As the resilient members, steel springs having a tongue for biasing the rollers may be used.

By integrally forming a torque-transmitting means on the outer periphery of the outer member, it is possible to reduce the number of parts and simplify the mounting work of the clutch.

The torque-transmitting means may be ribs formed on the outer periphery of the outer member.

By replacing at least one of the rollers with an engaging element having the same outer diameter as the rollers but having a different shape therefrom, it is possible to improve the retaining ability of grease and oil on the cam surfaces and the cylindrical surface, and thus to reduce the idling torque of the one-way clutch.

As the engaging element having a different shape, a grooved roller formed with at least one annular groove on the cylindrical surface of the roller, or a short roller shorter in length than the other rollers may be used.

By forming independent, minute recesses in the surface of the rollers in a random manner, it is possible to form a sufficient oil film on the surfaces of the rollers, to reduce the idling torque, and to suppress wear due to sliding during idling.

If the surface of the rollers formed with the recesses has an average surface roughness that, when indicated in terms of minimum root mean square RMS, the ratio RMS (L)/RMS (C) of the axial average surface roughness RMS (L) of the rollers to the circumferential average surface roughness RMS (C) is not more than 1.0, and the SK value, which is a parameter of surface roughness, is not more than −1.6 both in the axial and circumferential directions of the rollers, an oil film can be more easily formed for circumferential sliding of the rollers. Therefore, it is possible to improve the suppressing effect of wear due to sliding during idling.

Such surfaces of the rollers can be formed by special barrel polishing. The SK value represents the degree of balance of the distribution of protrusions and recesses with reference to the reference surface. If they are distributed symmetrically with respect to the reference surface, the SK value will be zero. The greater the rate of recesses to protrusions, the greater the negative value. Thus, by setting the SK value at −1.6 or lower, it is possible to provide sufficient oil-retaining recesses.

By forming, in the inner peripheral surface of the outer member or the outer peripheral surface of the inner member formed with the cam surfaces, at least one groove extending in the axial direction, and by engaging the resilient member in the groove, it is possible to facilitate the mounting of the resilient members.

By having one end of the resilient member tapered, it is possible to insert the resilient member from the tapered end and smoothly mount it without forcibly deflecting it.

By providing side plates for guiding both end faces of the rollers, and by providing a means for engaging the side plate to the end face of the outer member or inner member, it is possible to prevent the rollers from coming out and to simplify the assembling of the one-way clutch.

The means for engaging the side plate may be protrusions formed on the side plate at a plurality of points so as to engage recesses formed in the end face of the outer member or inner member.

By forming the cam surfaces on the outer periphery of the inner member, bringing the resilient member into engagement with the outer periphery of the inner member, and forming a torque-transmitting means on the inner periphery of the inner member, it is possible to minimize the influence of centrifugal force by making the rollers stationary during idling if the outer member is a rotation-transmitting side. For example, the outer member can be a clutch for a stator in a torque converter so as to stabilize the idling properties.

The torque-transmitting means formed on the inner periphery of the inner member may be a serration.

With the one-way clutch in which the cam surfaces are formed on the outer periphery of the inner member, by forming an annular groove in an inner cylindrical surface of the outer member, it is possible to increase the ability to retain grease on the cylindrical surface and thus to reduce the idling torque.

With the one-way clutch in which the cam surfaces are formed on the outer periphery of the inner member, by mounting it in a stator of a torque converter, it is possible to assure excellent clutch properties and reduce the cost.

Other features and objects of the present invention will become apparent from the following description made with reference to the accompanying drawings, in which:

BRIEF DESCRIPTION OF THE DRAWINGS

FIG. 1A is a front view of a one-way clutch of a first embodiment;

FIG. 1B is a sectional side view of the first embodiment;

FIG. 10 is a front view of a one-way clutch of a fifth embodiment with the side plate FIG. 11A is a partial enlarged front view of the fifth embodiment;

FIG. 11B is a developed view of the rollers of FIG. 11A;

FIG. 13A is a front view of a one-way clutch of a sixth embodiment;

FIG. 13B is a sectional side view of the sixth embodiment;

FIG. 15A is a front view of a one-way clutch of a seventh embodiment;

FIG. 15B is a sectional side view of the seventh embodiment;

DETAILED DESCRIPTION OF THE INVENTION

Figure 2A:
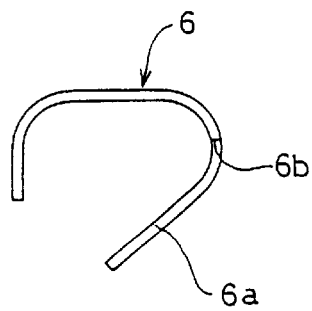
FIG. 2A is a front view of a spring of the first embodiment.

With reference to FIGS. 1–15, the embodiments of this invention will be described. FIGS. 1 and 2 show the first embodiment. This one-way clutch has, as shown in FIGS. 1A and 1B, a plurality of inclined cam surfaces 2 formed on the inner peripheral surface of an outer ring 1 (an outer member) made of a sintered metal. Rollers 4 are housed between these cam surfaces 2 and an outer cylindrical surface of a rotary shaft 3 (an inner member) in a full-type state.

In a groove 5 formed in the inner peripheral surface of the outer ring 1, a spring 6 made of a steel plate as a resilient member is engaged. A roller 4a abutting a tongue 6a of the spring 6 is biased by the spring in such a direction as to engage the cam surface 2. The biasing force of the tongue 6a is transmitted to all the rollers 4 through the rollers abutting each other, so that each roller 4 engages the respective cam surface 2 in one direction. Each cam surface 2 is defined by one flat surface.

On the outer surface of the outer ring 1, a plurality of ribs 7 (torque transmitting mechanism) are integrally formed.

The one-way clutch is prevented from coming off the rotary shaft 3 by a snap ring 9 through a side plate 8. In this embodiment, when the rotary shaft 3 rotates clockwise, all the rollers 4 engage the cam surfaces 2, so that torque of the rotary shaft 3 is transmitted to the outer ring 1. The torque transmitted to the outer ring is transmitted to a member engaging the ribs 7. When the rotary shaft 3 rotates counterclockwise, engagement between each roller 4 and the cam surface 2 is released, so that torque is not transmitted and the clutch is in an idling state.

Figure 2B:
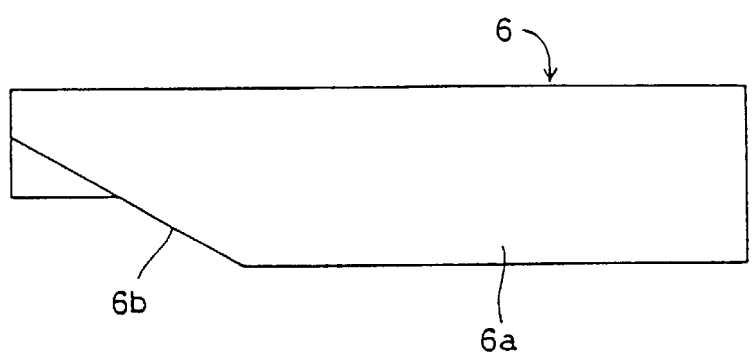
FIG. 2B is a side view of the first embodiment.

As shown in FIGS. 2A and 2B, the spring 6 is formed by bending a steel plate. One end of the tongue 6a is cut into a tapered portion 6b. After the rollers 4 have been mounted between the outer ring 1 and the rotary shaft 3, the spring 6 is inserted into the space between the outer ring 1 and the rollers 4 from the end face of the outer ring with the end of the spring having the tapered portion inserted first, and engaged in the groove 5. By inserting the tapered portion 6b into the space along the outer peripheral surface of the roller 4a, the tongue 6a deflects spontaneously. Thus it is possible to mount the spring 6 smoothly without retaining it by forcibly deflecting the tongue 6a.

Figure 3:
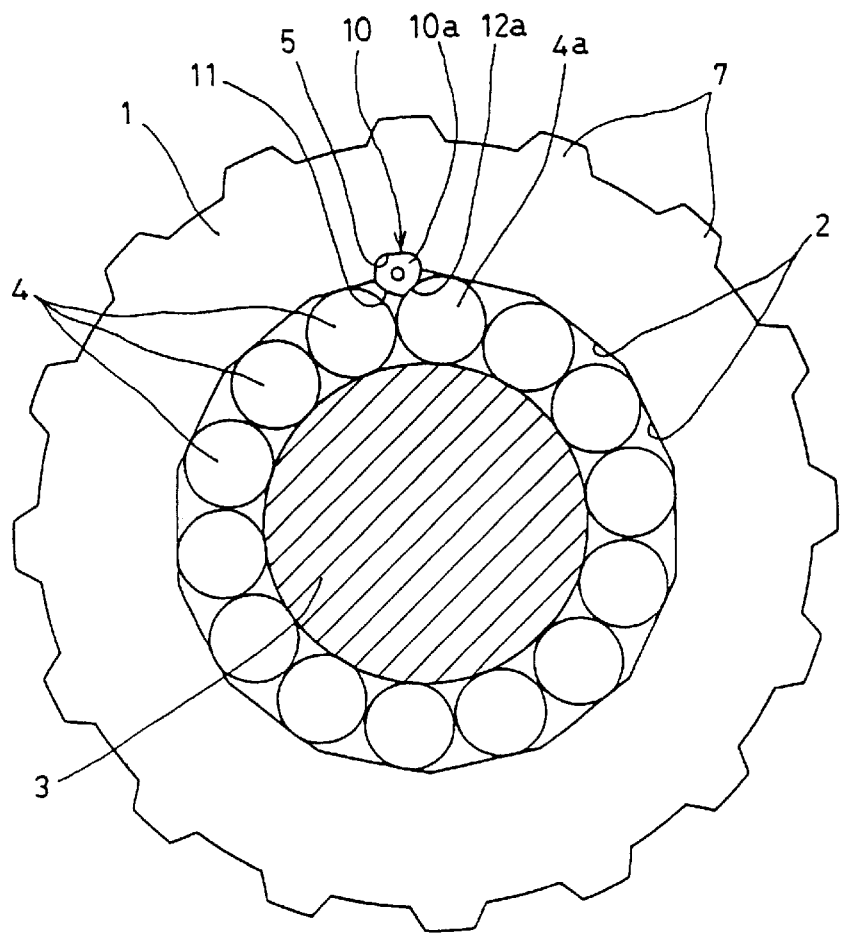
FIG. 3 is a front view of a one-way clutch of a second embodiment.

FIGS. 3 and 4 show the second embodiment. As shown in FIG. 3, with this one-way clutch, the outer ring 1 (the outer member) is also made of a sintered metal. But it differs from the first embodiment in that the resilient member for biasing the rollers 4 into engagement with the cam surfaces 2 is a rubber member 10. Since any other portions are the same as in the first embodiment, they are indicated by the same numerals as in FIG. 1.

Figure 4A:
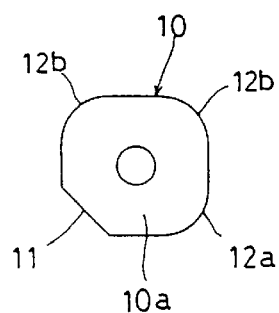
FIG. 4A is a front view of a rubber member of the second embodiment.
Figure 4B:
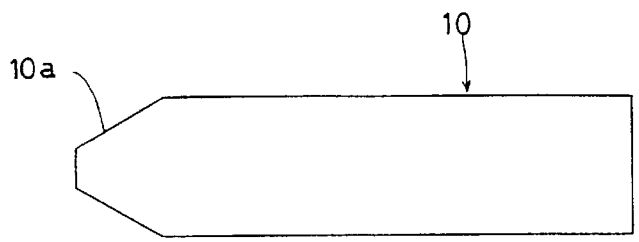
FIG. 4B is a side view of the second embodiment.

As shown in FIGS. 4A and 4B, the rubber member 10 is an elongated square pole with rounded corners. A tapered portion 10a is formed at one end thereof A chamfer 11 is provided at one corner. A corner 12a adjacent thereto abuts the adjacent roller 4a. The other two corner portions 12b are fitted in the groove 5. The chamfer 11 is provided to prevent the rubber member 10 from coming into contact with the roller 4 on the opposite side of the roller 4a when the corner portion 12a is resiliently deformed upon abutment with the roller 4a.

After the rollers 4 have been mounted between the outer ring 1 and the rotary shaft 3, the rubber member 10 is inserted into the space between the outer ring 1 and the rollers 4 from the end face side of the outer ring 1 with the tapered end of the rubber member inserted first, and engaged in the groove 5. When the tapered portion 10a is inserted, it is spontaneously elastically deformed so as to fit snugly in the groove 5. Thus it is possible to mount the rubber member 10 smoothly without forcibly deflecting it.

Figure 5:
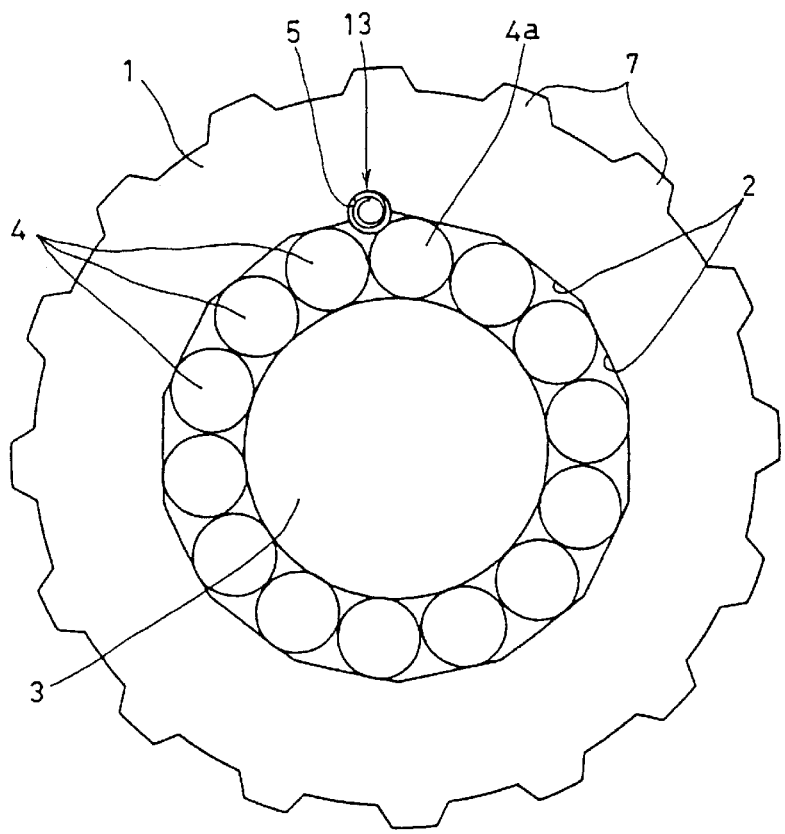
FIG. 5 is a front view of a one-way clutch of a third embodiment.

FIGS. 5 and 6 show the third embodiment. As shown in FIG. 5, with this one-way clutch, the outer ring 1 (the outer member) is made of a sintered metal. But it differs from the above embodiments in that the resilient member engaged in its groove 5 is a coil spring 13. Since any other portions are the same as in the first and second embodiments, they are indicated by the same numerals as in FIGS. 1 and 3.

Figure 6A:
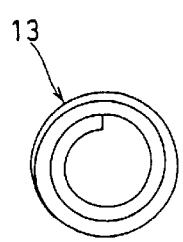
FIG. 6A is a front view of a coil spring of the third embodiment.
Figure 6B:
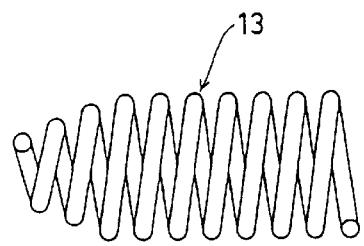
FIG. 6B is a side view of the third embodiment.

As shown in FIGS. 6A and 6B, the coil spring 13 also has one end thereof tapered, and is inserted smoothly in the space between the outer ring 1 and the rollers 4 from the end face side of the outer ring with the tapered end of the coil spring 13 inserted first, and engaged in the groove 5.

Figure 7A:
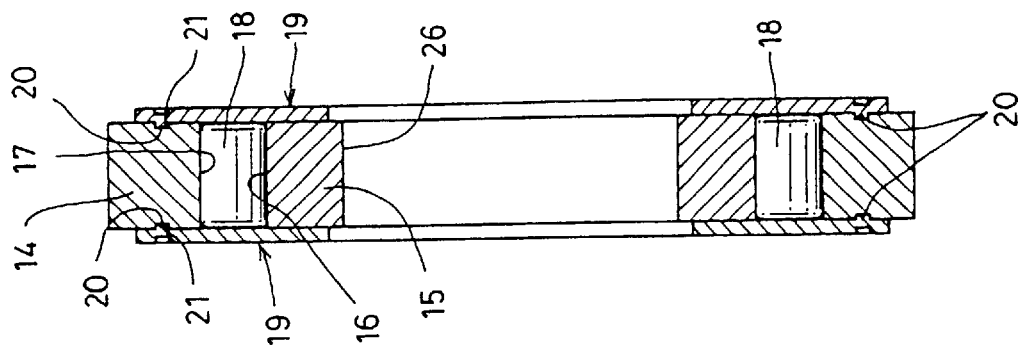
FIG. 7A is a sectional side view of a one-way clutch of a fourth embodiment.
Figure 7B:
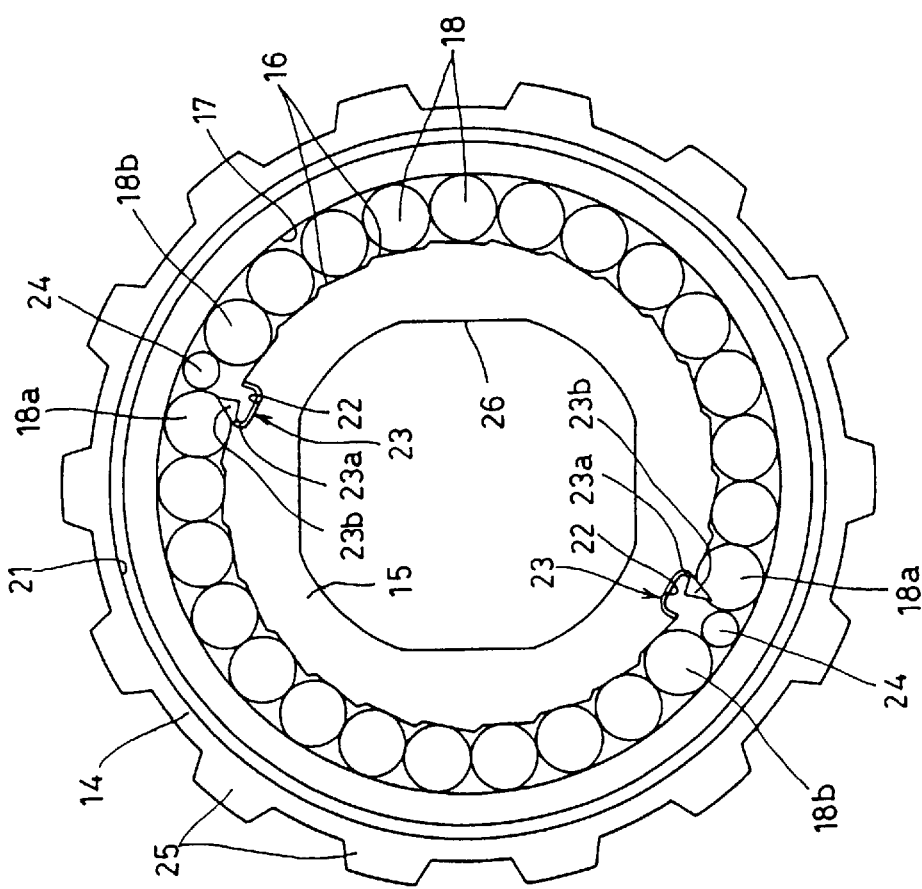
FIG. 7B is a front view of the fourth embodiment with the side plate removed.
Figure 8:
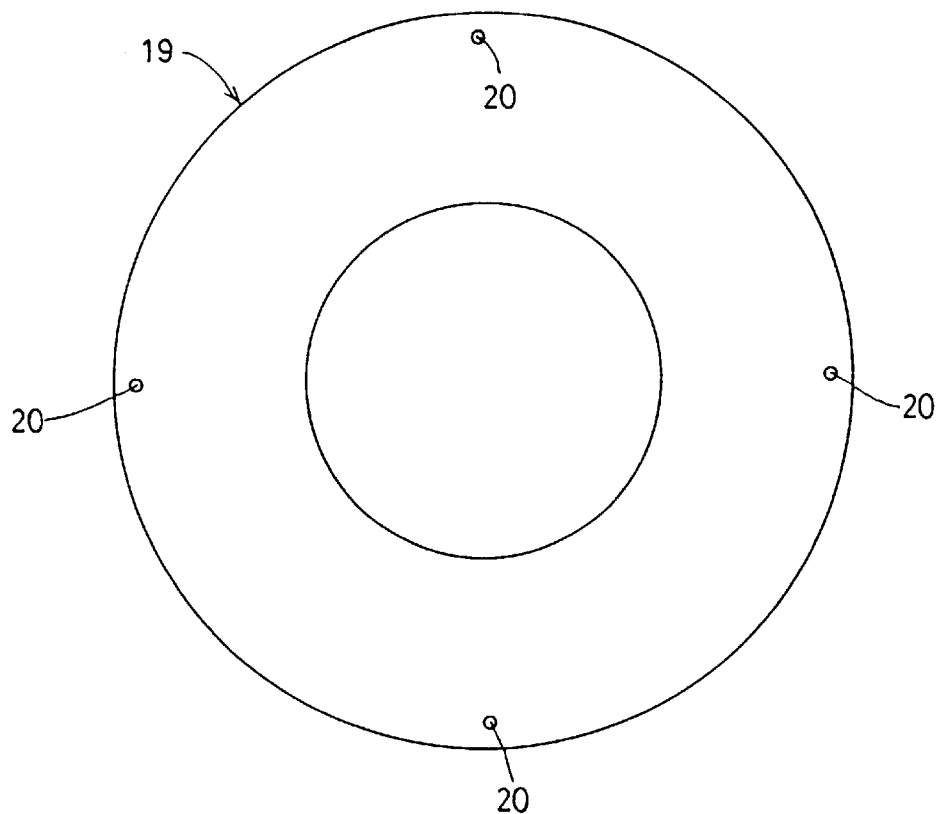
FIG. 8 is a front view of the side plate of the fourth embodiment.

FIGS. 7–9 show the fourth embodiment. With this one-way clutch, as shown in FIGS. 7A and 7B, an outer ring 14 (the outer member) and an inner ring 15 (the inner member) are formed by fine-blanking a steel plate. A plurality of inclined cam surfaces 16 are formed on the outer peripheral surface of the inner ring 15. Between these cam surfaces 16 and an inner cylindrical surface 17 of the outer ring 14, rollers 18 are housed so as to abut one another in a full-type state.

Side plates 19 for guiding the end faces of the rollers 18 are mounted to both ends of the outer ring 14. The side plates 19 are formed into ring shapes so as to cover the space in which the rollers 18 are housed (FIG. 7A). Four protrusions 20 are provided on one side thereof near the outer periphery at angular spacings of 90. Each side plate 19 is detachably mounted to the outer ring 14 by fitting these protrusions 20 in an annular groove 21 formed in either end face of the outer ring 14.

In the outer peripheral surface of the inner ring 15, grooves 22 are formed at two positions. A spring 23 made of a steel plate (a resilient member) is engaged in each groove 22. Rollers 18a that are in abutment with tongues 23a of springs 23 are biased in such a direction as to engage the cam surfaces 16. Opposite to each spring 23, a small-diameter auxiliary roller 24 is biased toward the outer ring 14 and is disposed between the rollers 18a and 18b (FIG. 7B). Thus, at the portions where the auxiliary rollers 24 are disposed, a biasing force of the springs 23 toward the side where the rollers 18 engage the cam surfaces 16 is transmitted through the auxiliary rollers 24. At other portions, as in the first to third embodiments, biasing force is transmitted to all the rollers 18 through the rollers, which are in abutment with each other.

On the outer peripheral surface of the outer ring 14, a plurality of ribs 25 (torque-transmitting mechanism) are integrally formed. The end of a rotary shaft is adapted to be fitted in a square hole 26 formed in the inner periphery of the inner ring 15 and having rounded corners. In this embodiment, when the inner ring 15 rotates clockwise or the outer ring 14 rotates counterclockwise, all the rollers 18 engage the cam surfaces 16. When the inner ring 15 or outer ring 14 rotate in the opposite direction, engagement is released. Each cam surface 16 is formed by a combination of two flat surfaces.

Figure 9A:
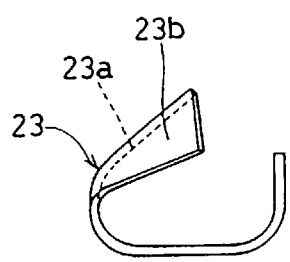
FIG. 9A is a front view of a spring used in the fourth embodiment.
Figure 9B:
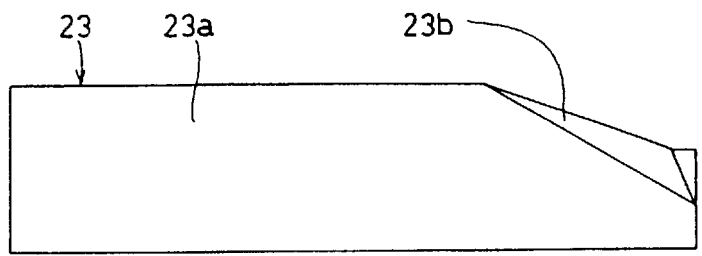
FIG. 9B is a side view of the fourth embodiment.

As shown in FIGS. 9A and 9B, each spring 23 is formed by cutting and bending a steel plate. The tongue 23a has one end bent inwardly in a triangular shape and tapered by the formation of a bent portion 23b. After the rollers 18 have been mounted between the outer ring 14 and the inner ring 15, the springs 23 are inserted in the spaces between the inner ring 15 and the rollers 18a, 18b and 24 with the side formed with the bent portion 23b inserted first, and engaged in the respective grooves 22. By inserting the bent portion 23b along the outer peripheral surface of the roller 18a, the tongue 23a deflects spontaneously, so that it is possible to mount the springs 23 smoothly without forcibly deflecting the tongue 23a.

FIGS. 10 and 11 show the fifth embodiment. With this one-way clutch, the basic structure is the same as the fourth embodiment, but it differs therefrom in that instead of the annular grooves 21 formed at both end faces of the outer ring 14 for engaging the protrusions 20 on the side plates 19, four holes 27 are formed at angular intervals of 90°. As shown in FIGS. 11A and 11B, alternate rollers 18 housed in a full type state are replaced with grooved rollers 28 having the same outer diameter and having an annular groove 28a. Since any other portions are the same as in the fourth embodiment, they are indicated by the same numerals as in FIG. 7.

The grooved rollers 28 are used to improve the ability to retain grease or oil on the cam surfaces 16 and the cylindrical surface 17 defining the space housing the rollers.

These grooved rollers 28 do not necessarily have to be arranged alternately, but by replacing one or more rollers 18 with grooved rollers 28, it is possible to improve the ability to retain grease and oil and reduce the idling torque of the one-way clutch.

Figure 12A:
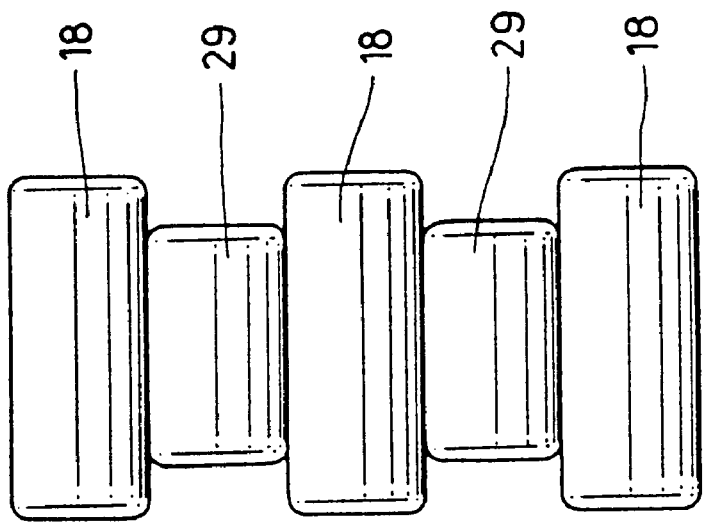
FIGS. 12A and 12B are developed views showing modified examples of arrangements of rollers.
Figure 12B:
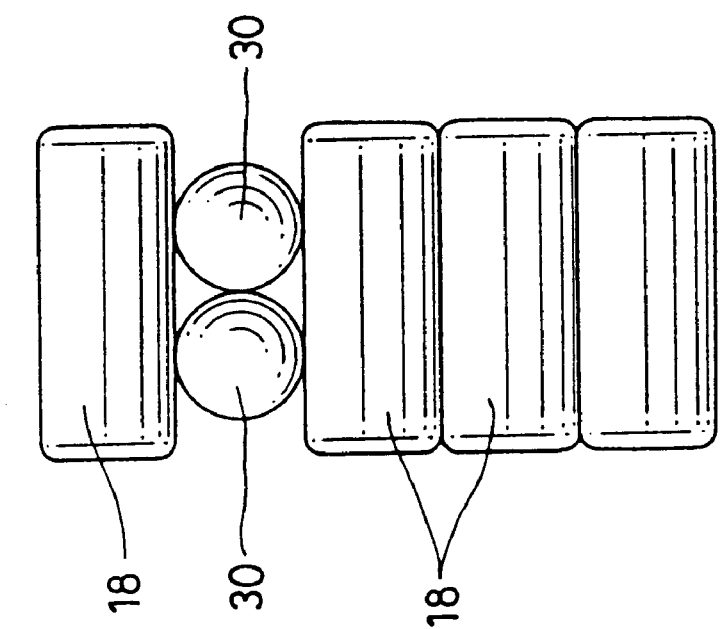

FIGS. 12A and 12B show further modifications of the rollers 18 shown in FIG. 11. FIG. 12A is an embodiment in which alternating rollers 18 are replaced with short rollers 29 having the same outer diameter but being shorter in length. FIG. 12B shows an embodiment in which one roller 18 is replaced with two balls 30 having the same outer diameter as the rollers 18.

In the fourth and fifth embodiments, the side plates on both sides for guiding end faces of the rollers engage the outer ring as the outer member. But, alternatively, they may engage the inner ring (the inner member), and only one of the side plates may be engaged.

FIGS. 13A and 13B show the sixth embodiment. This one-way clutch 31 is for a stator of a torque converter used in an automotive automatic transmission, and the inner ring 32 and the outer ring 33 are both made of a sintered metal. The basic structure of the clutch portion is the same as in the fourth and fifth embodiments. On the outer peripheral surface of the inner ring 32, a plurality of cam surfaces 34 and two grooves 35 are formed. Between the outer surface of the inner ring 32 and the inner surface of the outer ring 33, the rollers 37 disposed in a full type state through two auxiliary rollers 36 are biased in such a direction as to engage each cam surface 34 by a steel spring 38 engaged in each groove 35.

The inner ring 32 has a wide stepped portion on its inner peripheral side, on which serrations 39 (torque-transmitting mechanism) are formed. As shown in the FIG. 14, by coupling through the serrations 39, the clutch can be fixed to a stator shaft 48.

The outer ring 33 is also formed with a plurality of ribs 40 (torque-transmitting mechanism) on its outer periphery. Through these ribs 40, the clutch is coupled to the inner periphery of the stator 49 as a rotary member. With this one-way clutch 31, when the outer ring 33 rotates counterclockwise with its inner ring 32 fixed, all the rollers 37 are engaged by the cam surfaces 34. During rotation in the opposite direction, engagement is released, so that the outer ring 33 idles together with the stator 49.

On the surface of each roller 37, a plurality of independent, minute recesses are formed in a random manner. The surface roughness of each roller is such that the ratio RMS (L)/RMS (C) of the axial average surface roughness RMS (L) of the rollers 37 to the circumferential average surface roughness RMS (C) is 1.0 or less, and the SK value, which is a parameter of surface roughness, is −1.6 or less both in the axial and circumferential directions.

Thus, since a sufficient oil film is formed for the circumferential sliding of the rollers 37, wear of the rollers due to sliding during idling is effectively suppressed, and the idling torque decreases. Also, an annular groove 41 is formed in the inner cylindrical surface of the outer ring 33 to increase the lubricating oil retaining ability and thus to reduce the idling torque.

Figure 14:
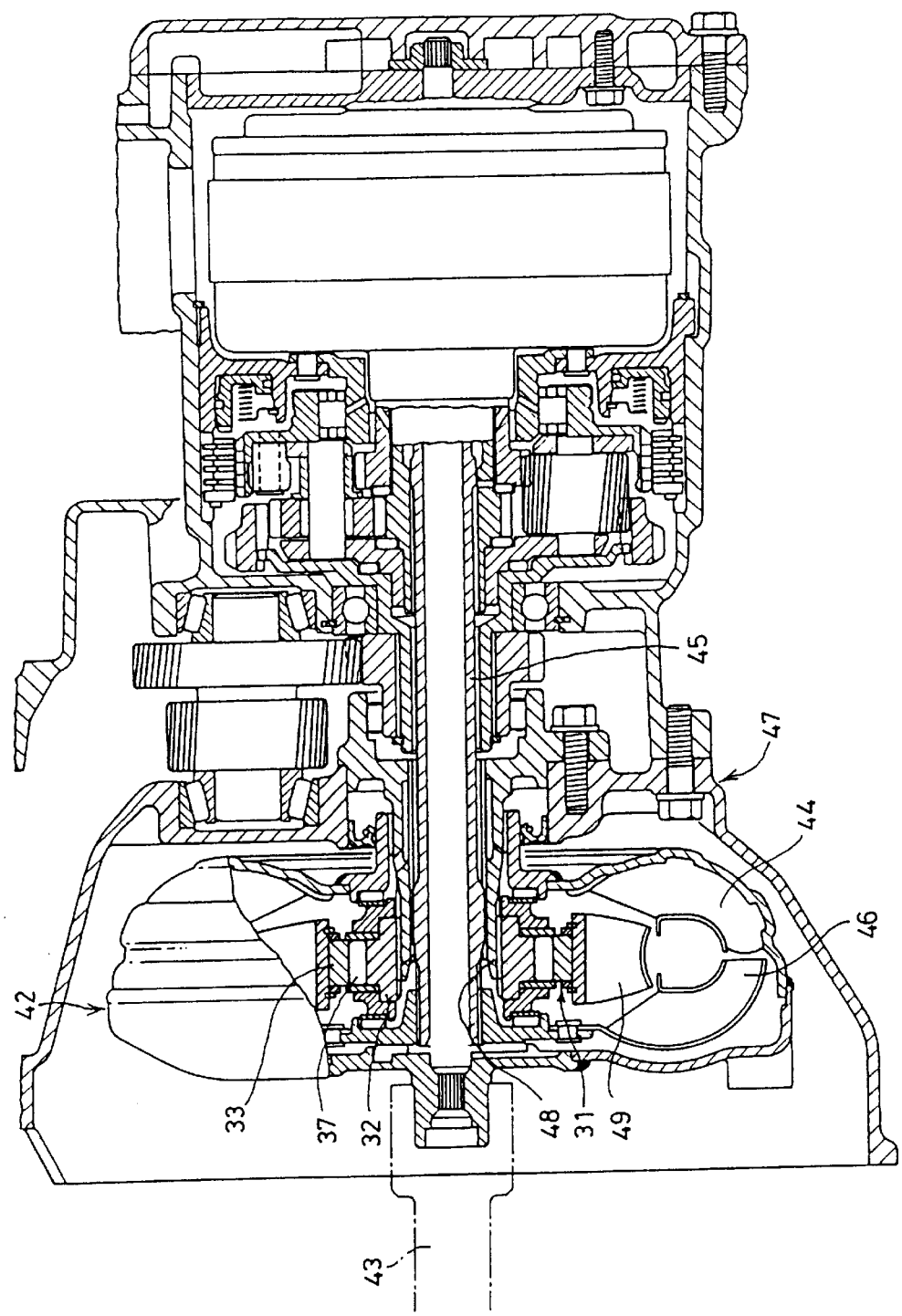
FIG. 14 is a vertical sectional view of a torque converter in which the one-way clutch of FIG. 13 has been mounted.
Figure 16:
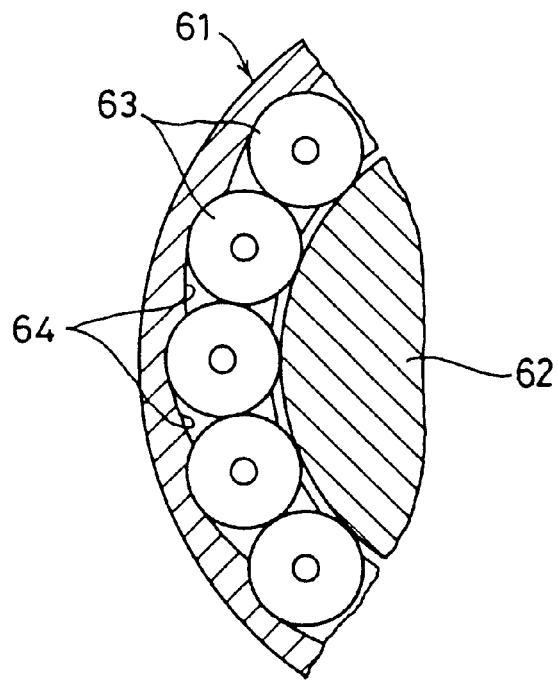
FIG. 16 is a partially omitted sectional view of a conventional one-way clutch.
Figure 17:
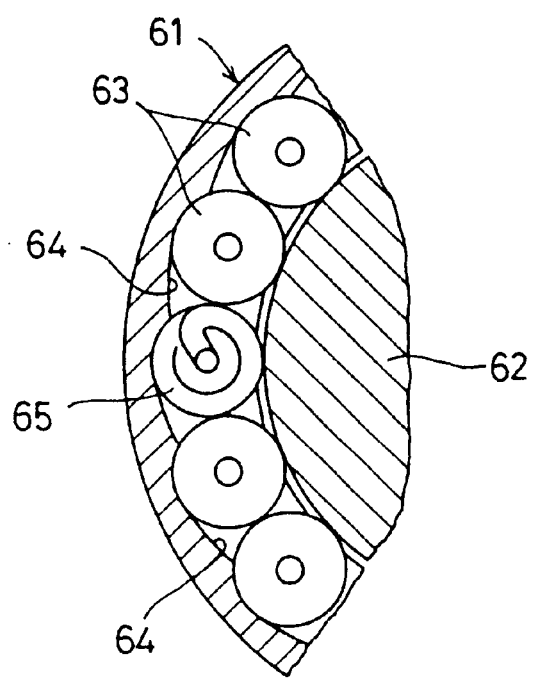
FIG. 17 is a partially omitted sectional view of another conventional one-way clutch.

FIG. 14 shows the one-way clutch 31 mounted in a torque converter 42 of an automatic transmission. This torque converter 42 basically comprises a pump impeller 44 coupled to an output shaft 43 of an engine, a turbine runner 46 arranged opposite the pump impeller 44 and coupled to an input shaft 45 of the transmission, and a stator 49 arranged between the pump impeller 44 and a turbine runner 46 and mounted through the one-way clutch 1 on a stator shaft 48 fixed to a casing 47.

When fluid circulating between the bowl-shaped pump impeller 44 and turbine runner 46 is returned from the turbine runner 46 to the pump impeller 44 on the inner-diameter side, the stator 49 serves to apply a turning force in a normal direction to the pump impeller 44 by changing the flow direction of the fluid to amplify the transmitted torque.

As described above, the inner ring 32 of the one-way clutch 31 is fixed to the stator shaft 48 through the serrations 39, while its outer ring 33 is coupled to the inner periphery of the stator 49 through the ribs 40. When the stator 49 receives a reaction force for changing the flow direction of the fluid, each roller 37 engages the respective cam surface 34 to bear the reaction force.

FIGS. 15A and 15B show the seventh embodiment. This one-way clutch has a plurality of cam surfaces 51 and a groove 52 formed on the outer peripheral surface of the inner ring 50. The rollers 54 arranged between the outer surface of the inner ring 50 and the inner surface of the outer ring 53 in a full type state are biased by a steel spring 55 in such a direction as to engage the respective cam surface 51. The inner ring 50 and the outer ring 53 are formed by blanking a steel plate.

The inner periphery of the inner ring 50 is shaped into a square hole 56 having rounded corners (a torque-transmitting mechanism). The outer peripheral surface of the outer ring 53 is provided with chamfers 57 at 90° intervals at four points, which also act as a torque-transmitting mechanism. With this one-way clutch, when the inner ring 50 turns clockwise or the outer ring 53 turns counterclockwise, all the rollers 54 engage the cam surfaces 51, and when they rotate in the opposite direction, engagement is released.

As with the sixth embodiment, in the surface of each roller 54, a multiplicity of independent, minute recesses are randomly formed. The surface roughness of each roller is such that the ratio RMS (L)/RMS (C) of the axial average surface roughness RMS (L) of the rollers 54 to the circumferential average surface roughness RMS (C) is 1.0 or less, and the SK value, which is a parameter of surface roughness, is −1.6 or less both in the axial and circumferential directions of the rollers 54. Further, an annular groove 58 is formed in the inner peripheral surface of the outer ring 53 to provide an excellent wear suppressing effect for the rollers and good idling properties.

While in each of the above embodiments, each cam surface was formed by one flat surface or a combination of two flat surfaces, it may be formed of a curved surface. Also, strictly speaking, a slight clearance is permitted between the rollers in a full type state in each embodiment. The permissible amount of clearance is set below the amount of resilient displacement of the rollers and inner and outer rings during rated loading of the one-way clutch so that all the rollers continue to abut one another during rated loading.

As described above, with the one-way clutch of this invention, since the rollers adapted to engage the inclined cam. surfaces formed on the inner peripheral surface of the outer member or the outer peripheral surface of the inner member are provided in a full type state, and engage the inner peripheral surface of the outer member or the outer peripheral surface of the inner member without disposing any roller-biasing resilient members between the rollers, all the rollers can maintain a mutually abutting state directly or through the auxiliary rollers. Thus, it is possible to reliably and instantly transmit the biasing force of the resilient member to all the rollers. Thus, a reduction in the torque-transmitting ability will not occur, and also the responsiveness of turning on and off the clutch is improved.

What is claimed is:

1. A one-way clutch comprising:
   an outer member having an inner peripheral surface;
   an inner member having an outer peripheral surface, a first one of said inner peripheral surface of said outer member and said outer peripheral surface of said inner member having a plurality of inclined cam surfaces formed thereon, and a second one of said inner peripheral surface of said outer member and said outer peripheral surface of said inner member having a cylindrical surface;
   a plurality of rollers arranged between said outer member and said inner member so as to oppose said cam surfaces and so that adjacent rollers abut each other; and
   a resilient member engaging one of said inner peripheral surface of said outer member and said outer peripheral surface of said inner member, said resilient member being arranged to bias said rollers in a circumferential direction with respect to said inner member and said outer member so that said rollers engage said cam surfaces.

2. The clutch of claim 1, wherein said rollers and said resilient member are arranged such that said resilient member biases all of said rollers simultaneously in the circumferential direction.

3. The clutch of claim 1, wherein said plurality of rollers includes auxiliary rollers and a remaining group of rollers, each of said auxiliary rollers having a diameter smaller than a diameter of each of said remaining group of rollers.

4. The clutch of claim 3, further comprising a plurality of resilient members, wherein each of said auxiliary rollers is arranged at a location adjacent to a respective one of said resilient members.

5. The clutch of claim 1, wherein at least one of said outer member and said inner member is made of sintered metal.

6. The clutch of claim 1, wherein at least one of said outer member and said inner member is made of blanked steel plate.

7. The clutch of claim 6, wherein said at least one of said outer member and said inner member made of blanked steel plate is fine-blanked to a finished dimension of said at least one of said outer member and said inner member.

8. The clutch of claim 1, wherein said resilient member comprises a steel spring having a tongue for biasing said rollers.

9. The clutch of claim 1, wherein said outer member has a torque-transmitting mechanism formed on an outer periphery thereof.

10. The clutch of claim 9, wherein said torque-transmitting mechanism comprises ribs formed on said outer periphery of said outer member.

11. The clutch of claim 1, wherein said plurality of rollers includes at least one engaging element and a remaining group of rollers, each of said at least one engaging element having an outer diameter equal to an outer diameter of each of said remaining group of rollers, and each of said at least one engaging element having a different shape than each of said remaining group of rollers.

12. The clutch of claim 11, wherein each of said at least one engaging element comprises a grooved roller having a cylindrical surface with at least one annular groove.

13. The clutch of claim 11, wherein each of said at least one engaging element comprises a short roller having a shorter length than each of said remaining group of rollers.

14. The clutch of claim 1, wherein a surface of each of said rollers has a plurality of independent, minute recesses arranged in a random manner.

15. The clutch of claim 14, wherein said surface of each of said rollers has said recesses arranged such that an average surface roughness of said rollers is expressed as a minimum root mean square RMS such that a ratio RMS (L)/RMS (C) of the axial average surface roughness RMS (L) of the rollers to the circumferential average surface roughness RMS (C) is no greater than 1.0, and such that a parameter of surface roughness SK is no greater than −1.6 in an axial direction and a circumferential direction of said rollers.

16. The clutch of claim 1, wherein said first one of said inner peripheral surface of said outer member and said outer peripheral surface of said inner member having said plurality of inclined cam surfaces formed thereon further has at least one groove extending in an axial direction with respect to said outer member and said inner member, said resilient member being arranged in said at least one groove.

17. The clutch of claim 16, wherein said resilient member has a tapered end.

18. The clutch of claim 1, further comprising side plates for guiding said rollers, at least one of said side plates engaging an end face of one of said outer member and said inner member.

19. The clutch of claim 18, wherein said at least one of said side plates has protrusions arranged at a plurality of locations so as to engage recesses formed in said end face of one of said outer member and said inner member.

20. The clutch of claim 1, further comprising a torque-transmitting mechanism formed on said inner peripheral surface of said inner member, wherein said cam surfaces are formed on said outer peripheral surface of said inner member, and said resilient member engage said outer peripheral surface of said inner member.

21. The clutch of claim 20, wherein said torque-transmitting mechanism comprises a serration.

22. The clutch of claim 20, wherein said inner peripheral surface of said outer member has an annular groove formed therein.

* * * * *